United States Patent
Fujimura et al.

(10) Patent No.: US 11,879,365 B2
(45) Date of Patent: Jan. 23, 2024

(54) STEAM TURBINE PLANT AND OPERATION METHOD, COMBINED CYCLE PLANT AND OPERATION METHOD

(71) Applicant: Mitsubishi Power, Ltd., Kanagawa (JP)

(72) Inventors: Daiki Fujimura, Kanagawa (JP); Susumu Sekine, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 190 days.

(21) Appl. No.: 17/603,472

(22) PCT Filed: Mar. 3, 2020

(86) PCT No.: PCT/JP2020/008994
§ 371 (c)(1),
(2) Date: Oct. 13, 2021

(87) PCT Pub. No.: WO2020/217719
PCT Pub. Date: Oct. 29, 2020

(65) Prior Publication Data
US 2022/0195896 A1   Jun. 23, 2022

(30) Foreign Application Priority Data
Apr. 23, 2019  (JP) .................................. 2019-082223

(51) Int. Cl.
*F01K 13/02* (2006.01)
*F01K 7/16* (2006.01)
(Continued)

(52) U.S. Cl.
CPC ................ *F01K 7/165* (2013.01); *F01K 9/00* (2013.01); *F01K 13/02* (2013.01); *F01K 17/00* (2013.01)

(58) Field of Classification Search
CPC .......... F01K 23/10; F01K 23/101; F01K 13/02
See application file for complete search history.

(56) References Cited

U.S. PATENT DOCUMENTS 5,199,256 A * 4/1993 Moore .................... F01D 21/00
60/39.182
5,979,156 A * 11/1999 Uematsu ............... F01K 23/106
60/39.182

(Continued)

FOREIGN PATENT DOCUMENTS

JP    53-118605    10/1978
JP    58-102701     7/1983
(Continued)

OTHER PUBLICATIONS

International Search Report dated May 26, 2020 in corresponding International (PCT) Application No. PCT/JP2020/008994.
(Continued)

*Primary Examiner* — Thuyhang N Nguyen
(74) *Attorney, Agent, or Firm* — Wenderoth, Lind & Ponack, L.L.P.

(57) ABSTRACT

A steam turbine plant and an operating method thereof, and a combined cycle plant and an operating method thereof, include: a turbine; steam supply lines that supply main steam to the turbine; a steam control valve and an intercept valve provided to the steam supply lines; and a first auxiliary steam supply line that supplies auxiliary steam to the turbine via the steam supply lines which are located farther downstream than the steam control valve and the intercept valve.

15 Claims, 12 Drawing Sheets

(51) Int. Cl.
    *F01K 9/00*         (2006.01)
    *F01K 17/00*       (2006.01)

(56)                 References Cited

U.S. PATENT DOCUMENTS

| | | | |
|---|---|---|---|
| 10,920,623 B2* | 2/2021 | Nagayama | F01K 7/165 |
| 11,326,465 B2* | 5/2022 | Fujimura | F01K 23/108 |
| 2010/0229523 A1* | 9/2010 | Holt | F02C 6/18 |
| | | | 60/39.182 |
| 2010/0236240 A1* | 9/2010 | Hu | F02C 6/18 |
| | | | 60/670 |
| 2020/0200051 A1* | 6/2020 | Hehs | F02C 6/18 |

FOREIGN PATENT DOCUMENTS

| | | |
|---|---|---|
| JP | 58-160502 | 9/1983 |
| JP | 62-75005 | 4/1987 |
| JP | 6-81609 | 3/1994 |
| JP | 11-336509 | 12/1999 |
| JP | 2001-289009 | 10/2001 |
| JP | 2013-76388 | 4/2013 |
| JP | 2014-159794 | 9/2014 |

OTHER PUBLICATIONS

English Translation of Written Opinion dated May 26, 2020 in corresponding International (PCT) Patent Application No. PCT/JP2020/008994.

* cited by examiner

STEAM TURBINE PLANT AND OPERATION METHOD, COMBINED CYCLE PLANT AND OPERATION METHOD

TECHNICAL FIELD

The present invention relates to a steam turbine plant used in a thermal power plant or the like and a method for operating a steam turbine plant, and a combined cycle plant including a steam turbine plant and an operating method.

BACKGROUND ART

For example, in a combined cycle plant, a gas turbine is driven by using natural gas or the like as a fuel, a heat recovery steam generator recovers flue gas of the gas turbine to generate steam, and a steam turbine is driven by the steam to generate electric power is a combined cycle.

Such a combined cycle plant is described, for example, in PTL 1 below.

CITATION LIST

Patent Literature

[PTL 1] Japanese Unexamined Patent Application Publication No. 58-160502

SUMMARY OF INVENTION

Technical Problem

In the case of a start-up of the combined cycle plant, when deviation between a steam temperature at an inlet of the steam turbine and a metal temperature of the steam turbine is large, the start-up becomes a cold start-up. For this reason, a load on the gas turbine is reduced, and a start-up is performed. Then, in a state where the load on the gas turbine is reduced as much as possible and the steam temperature is lowered as much as possible, the supply of the steam to the steam turbine is started. In recent years, the combination use of the combined cycle plant and renewable energies such as solar, wind, geothermal, and hydro energies has been increasing. However, since the amount of electric power generated by the renewable energies varies depending on weather conditions, the frequency of stopping an operation of the combined cycle plant increases. However, when the combined cycle plant is started up in cold conditions, the start-up time of the steam turbine increases, and a sufficient amount of electric power cannot be secured, which is a problem.

The present invention has been made to solve the above problem, and an object of the present invention is to provide a steam turbine plant and an operating method and a combined cycle plant and an operating method capable of securing a required amount of electric power at an early stage by shortening the start-up time.

Solution to Problem

According to an aspect of the present invention to achieve the above object, there provided a steam turbine plant including: a turbine; a main steam supply line that supplies main steam to the turbine; a control valve provided in the main steam supply line; and a first auxiliary steam supply line that supplies auxiliary steam to the turbine via the main steam supply line on a downstream side of the control valve.

Therefore, the auxiliary steam can be supplied to the turbine via the main steam supply line on the downstream side of the control valve by the first auxiliary steam supply line. Before the start-up of a steam turbine, the auxiliary steam can be supplied to and can pre-warm up the turbine, and the start-up time of the steam turbine can be shortened to secure a required amount of electric power at an early stage.

In the steam turbine plant of the present invention, a drain discharge line is provided between the turbine and the control valve in the main steam supply line, and the first auxiliary steam supply line is connected to the drain discharge line.

Therefore, since the first auxiliary steam supply line is connected to the drain discharge line, when the auxiliary steam is supplied to and pre-warms up the turbine, generated drain can be easily discharged from the drain discharge line.

In the steam turbine plant of the present invention, drain valves are provided in the drain discharge line on an upstream side and a downstream side of a connecting portion of the first auxiliary steam supply line, respectively.

Therefore, the system on the downstream side of the drain discharge line can be warmed up by closing the drain valve on the upstream side of the drain discharge line and opening the drain valve on the downstream side, and the system on the upstream side of the drain discharge line can be warmed up by opening the drain valve on the upstream side of the drain discharge line and closing the drain valve on the downstream side.

In the steam turbine plant of the present invention, the drain discharge line is connected to a condenser.

Therefore, the drain discharge line is connected to the condenser, so that generated drain can be recirculated.

In the steam turbine plant of the present invention, the turbine includes a high and medium-pressure turbine of which one end portion in an axial direction is provided with a high-pressure turbine portion and of which the other end portion is provided with a medium-pressure turbine portion, and a low-pressure turbine disposed coaxially with the high and medium-pressure turbine, and the first auxiliary steam supply line is disposed with respect to the high-pressure turbine portion and the medium-pressure turbine portion.

Therefore, the auxiliary steam is supplied to the high-pressure turbine portion and the medium-pressure turbine portion, so that before the start-up of the steam turbine, the high-pressure turbine portion and the medium-pressure turbine portion can be pre-warmed up, and the start-up time of the steam turbine can be shortened.

In the steam turbine plant of the present invention, a second auxiliary steam supply line is provided which supplies the auxiliary steam to the turbine via the control valve and the main steam supply line.

Therefore, the auxiliary steam can be supplied to the control valve by the second auxiliary steam supply line, and before the start-up of the steam turbine, the auxiliary steam can be supplied to and can pre-warm up the control valve, and the start-up time of the steam turbine can be shortened.

The steam turbine plant of the present invention further includes a control device which performs control such that the auxiliary steam is supplied from the first auxiliary steam supply line and the main steam supply line to the turbine before a drive timing of a main steam generation source.

Therefore, the control device performs control such that the auxiliary steam is supplied to the turbine by the first auxiliary steam supply line before the drive timing of the main steam generation source. As a result, the steam turbine can be pre-warmed up by the auxiliary steam, and the start-up time of the steam turbine can be shortened.

In the steam turbine plant of the present invention, the control device performs control such that the auxiliary steam is supplied from the first auxiliary steam supply line and the main steam supply line to the turbine after vacuum processing of a condenser is completed.

Therefore, the auxiliary steam is supplied to the turbine after the vacuum processing of the condenser is completed, so that drain recovered by the condenser can be quickly processed.

In the steam turbine plant of the present invention, the control device performs control such that a supply of the auxiliary steam to the turbine is stopped when or before a condition for supplying steam to the turbine is satisfied.

Therefore, the supply of the auxiliary steam to the turbine is stopped when or before the condition for supplying the steam to the turbine is satisfied, so that the main steam can be supplied to the main steam supply line, and the steam turbine can be started up properly.

In the steam turbine plant of the present invention, the control device performs control such that a supply of the auxiliary steam to the turbine is stopped after a load is applied to the main steam generation source.

Therefore, the supply of the auxiliary steam to the turbine is stopped after the load is applied to the main steam generation source, so that the main steam which has increased in temperature can be supplied to the main steam supply line, and the steam turbine can be started up properly.

In the steam turbine plant of the present invention, a drain discharge line is provided between the turbine and the control valve in the main steam supply line, the first auxiliary steam supply line is connected to the drain discharge line, a first drain valve is provided in the drain discharge line on a turbine side with respect to a connecting portion of the first auxiliary steam supply line, a second drain valve is provided on a side opposite the turbine, and the control device performs control such that the auxiliary steam is supplied to a second drain valve side before the drive timing of the main steam generation source, and then is supplied to a first drain valve side.

Therefore, the control device causes the first drain valve to be closed and causes the second drain valve to be opened, so that the system on the second drain valve side of the drain discharge line can be warmed up, and the control device causes the first drain valve to be opened and the second drain valve to be closed, so that the system on the first drain valve side of the drain discharge line and the turbine can be warmed up.

In the steam turbine plant of the present invention, a second auxiliary steam supply line is provided which supplies the auxiliary steam to the turbine via the control valve and the main steam supply line, and the control device performs control such that when the auxiliary steam is supplied to the turbine, the auxiliary steam is supplied from the second auxiliary steam supply line to the control valve.

Therefore, the control device performs control such that the auxiliary steam is supplied to the turbine and is supplied to the control valve by the second auxiliary steam supply line. As a result, before the start-up of the steam turbine, the turbine and the control valve can be pre-warmed up by the auxiliary steam, and the start-up time of the steam turbine can be shortened.

In addition, according to an aspect of the present invention, there is provided a method for operating a steam turbine plant, the method including: a step of supplying auxiliary steam to a turbine from a downstream side of a control valve provided in a main steam supply line before a drive timing of a main steam generation source; a step of stopping a supply of the auxiliary steam to the turbine when or before a condition for supplying steam to the turbine is satisfied; and a step of starting a supply of main steam to the turbine when the condition for supplying the steam to the turbine is satisfied after the supply of the auxiliary steam to the turbine is stopped.

Therefore, before the start-up of the steam turbine, the auxiliary steam can be supplied to and can pre-warm up the turbine, and the start-up time of the steam turbine can be shortened to secure a required amount of electric power at an early stage.

In addition, according to an aspect of the present invention, there is provided a combined cycle plant including: a gas turbine including a compressor, a combustor, and a turbine; a heat recovery steam generator that uses waste heat of flue gas from the gas turbine to generate steam; and the steam turbine plant driven by the steam generated by the heat recovery steam generator.

Therefore, before the start-up of the steam turbine, the auxiliary steam can be supplied to and can pre-warm up the turbine, and the start-up time of the steam turbine can be shortened to secure a required amount of electric power at an early stage.

According to an aspect of the present invention, there is provided a combined cycle plant including: a gas turbine including a compressor, a combustor, and a turbine; a heat recovery steam generator that uses waste heat of flue gas from the gas turbine to generate steam; and the steam turbine plant that is driven by the steam generated by the heat recovery steam generator. A drive timing of a main steam generation source is a steam generation start timing of the heat recovery steam generator, which is determined by ignition of the gas turbine.

Therefore, before the start-up of the steam turbine, the auxiliary steam can be supplied to and can pre-warm up the turbine, and the start-up time of the steam turbine can be shortened to secure a required amount of electric power at an early stage.

According to an aspect of the present invention, there is provided a method for operating a combined cycle plant including a gas turbine including a compressor, a combustor, and a turbine, a heat recovery steam generator that uses waste heat of flue gas from the gas turbine to generate steam, and a steam turbine plant driven by the steam generated by the heat recovery steam generator, the method including: a step of supplying auxiliary steam to a turbine from a downstream side of a control valve provided in a main steam supply line before a steam generation timing of the heat recovery steam generator, which is determined by ignition of the gas turbine; step of stopping a supply of the auxiliary steam to the turbine when or before a condition for supplying the steam to the turbine is satisfied; and a step of starting a supply of main steam to the turbine when the condition for supplying the steam to the turbine is satisfied after the supply of the auxiliary steam to the turbine is stopped.

Therefore, before the start-up of the steam turbine, the auxiliary steam can be supplied to and can pre-warm up the turbine, and the start-up time of the steam turbine can be shortened to secure a required amount of electric power at an early stage.

Advantageous Effects of Invention

According to the steam turbine plant and the operating method, and the combined cycle plant and the operating method of the present invention, the start-up time can be shortened to secure a required amount of electric power at an early stage.

DESCRIPTION OF EMBODIMENTS

Hereinafter, exemplary embodiments of the present invention will be described in detail with reference to the accompanying drawings. However, the present invention is not limited by the embodiments, and in the case of a plurality of embodiments, the present invention also includes a combination of the embodiments.

First Embodiment

Figure 1:
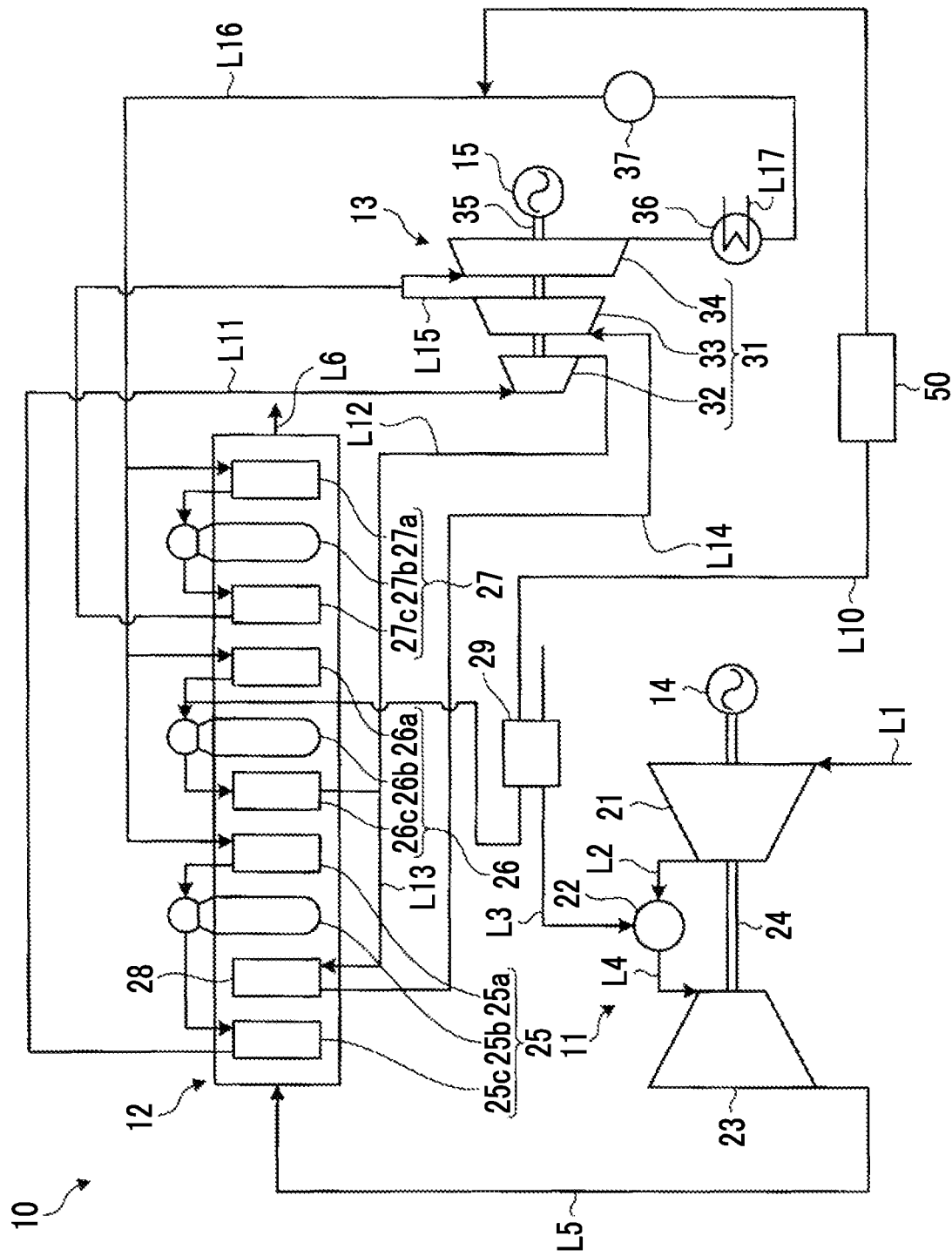
FIG. 1 is a schematic configuration diagram illustrating a combined cycle plant of a first embodiment.

FIG. 1 is a schematic configuration diagram illustrating a combined cycle plant of a first embodiment.

In the first embodiment, as illustrated in FIG. 1, a combined cycle plant 10 includes a gas turbine 11, a heat recovery steam generator (HRSG) 12, a steam turbine 13, and generators 14 and 15.

The gas turbine 11 includes a compressor 21, a combustor 22, and a turbine 23. The compressor 21 and the turbine 23 are integrally rotatably connected to each other by a rotary shaft 24, and the generator 14 is connected to the rotary shaft 24. The compressor 21 compresses air taken in from an air intake line L1. The combustor 22 mixes the compressed air supplied from the compressor 21 through a compressed air supply line L2 and fuel gas supplied from a fuel gas supply line L3 to combust the mixed air and fuel gas. The turbine 23 is rotationally driven by combustion gas supplied from the combustor 22 through a combustion gas supply line L4. The generator 14 uses a rotating force, which is transmitted by the rotation of the turbine 23, to generate electric power.

The heat recovery steam generator 12 uses waste heat of flue gas, which is discharged from the gas turbine 11 (turbine 23) via a flue gas discharge line L5, to generate steam. The heat recovery steam generator 12 includes a high-pressure unit 25, a medium-pressure unit 26, a low-pressure unit 27, and a reheater 28. The flue gas from the gas turbine 11 flows upward inside the heat recovery steam generator 12, so that the heat recovery steam generator 12 recovers heat in order of the high-pressure unit 25, the medium-pressure unit 26, and the low-pressure unit 27 to generate steam.

The high-pressure unit 25 includes a high-pressure economizer 25a, a high-pressure evaporator 25b, and a high-pressure superheater 25c. After supply water is heated by the high-pressure economizer 25a, the supply water is fed to the high-pressure evaporator 25b via a first high-pressure steam line and is heated here to generate high-pressure steam, and the high-pressure steam is fed to the high-pressure superheater 25c via a second high-pressure steam line and is superheated. The medium-pressure unit 26 includes a medium-pressure economizer 26a, a medium-pressure evaporator 26b, and a medium-pressure superheater 26c. Therefore, after the supply water is heated by the medium-pressure economizer 26a, the supply water is fed to the medium-pressure evaporator 26b via a first medium-pressure steam line and is heated here to generate medium-pressure steam, and the medium-pressure steam is fed to the medium-pressure superheater 26c Via a second medium-pressure steam line and is superheated. In addition, the supply water heated by the medium-pressure economizer 26a is supplied to a fuel heater 29 by a medium-pressure supply water line L10 branching from the second medium-pressure steam line. The low-pressure unit 27 includes a low-pressure economizer 27a, a low-pressure evaporator 27b, and a low-pressure superheater 27c. Therefore, after the supply water is heated by the low-pressure economizer 27a, the supply water is fed to the low-pressure evaporator 27b via a first low-pressure steam line and is heated here to generate low-pressure steam, and the low-pressure steam is fed to the low-pressure superheater 27c via a second low-pressure steam line and is superheated.

The steam turbine 13 is driven by the superheated steam generated by the heat recovery steam generator 12, and includes a turbine 31. In the turbine 31, a high-pressure turbine 32, a medium-pressure turbine 33, and a low-pressure turbine 34 are integrally rotatably connected to each other by a rotary shaft 35, and the generator 15 is connected to the rotary shaft 35. The steam turbine 13 is provided with a condenser 36 that cools the steam that has driven the low-pressure turbine 34. The condenser 36 cools the steam, which is discharged from the low-pressure turbine 34, with cooling water (for example, seawater) to generate a condensate.

The high-pressure steam of the high-pressure superheater 25c is supplied to the high-pressure turbine 32 by a high-pressure steam supply line L11, and the high-pressure steam discharged from the high-pressure turbine returns to the reheater 28 via a high-pressure steam recovery line L12. The medium-pressure steam of the medium-pressure superheater 26c is supplied to the reheater 28 by the high-pressure steam circulation line L13. The medium-pressure steam superheated by the reheater 28 is supplied to the medium-pressure turbine 33 by a medium-pressure steam supply line L14, and the medium-pressure steam discharged from the medium-pressure turbine 33 is supplied to the low-pressure turbine 34 by a low-pressure steam supply line L15. The generator 15 uses a rotating force, which is transmitted by the rotation of the turbine 31, to generate electric power. In addition, the condenser 36 delivers the generated condensate to each of the economizers 25a, 26a, and 27a of the heat recovery steam generator 12 via a condensate supply line L16. The condensate supply line L16 is provided with a condensate pump 37. In addition, the condenser 36 is provided with a cooling water line L17 that cools the steam with seawater Meanwhile, the heat recovery steam generator 12 is connected to a stack (not illustrated) via a flue gas discharge line L6 that discharges the flue gas which has been used to generate the steam.

Therefore, during operation of the combined cycle plant 10, in the gas turbine 11, the compressor 21 compresses air and the combustor 22 mixes the supplied compressed air and fuel gas to combust the mixed air and fuel gas. The turbine 23 is rotationally driven by the combustion gas supplied from the combustor 22, so that the generator 14 generates electric power. In addition, the flue gas discharged from lie gas turbine 11 (turbine 23) is fed to the heat recovery steam generator 12, the heat recovery steam generator 12 generates steam, and the superheated steam is fed to the steam turbine 13. The high-pressure turbine 32, the medium-pressure turbine 33, and the low-pressure turbine 34 are rotationally driven by the superheated steam, so that the generator 15 generates electric power. The steam used by the low-pressure turbine 34 is cooled by the condenser 36 to become a condensate, and the condensate returns to the heat recovery steam generator 12.

Figure 2:
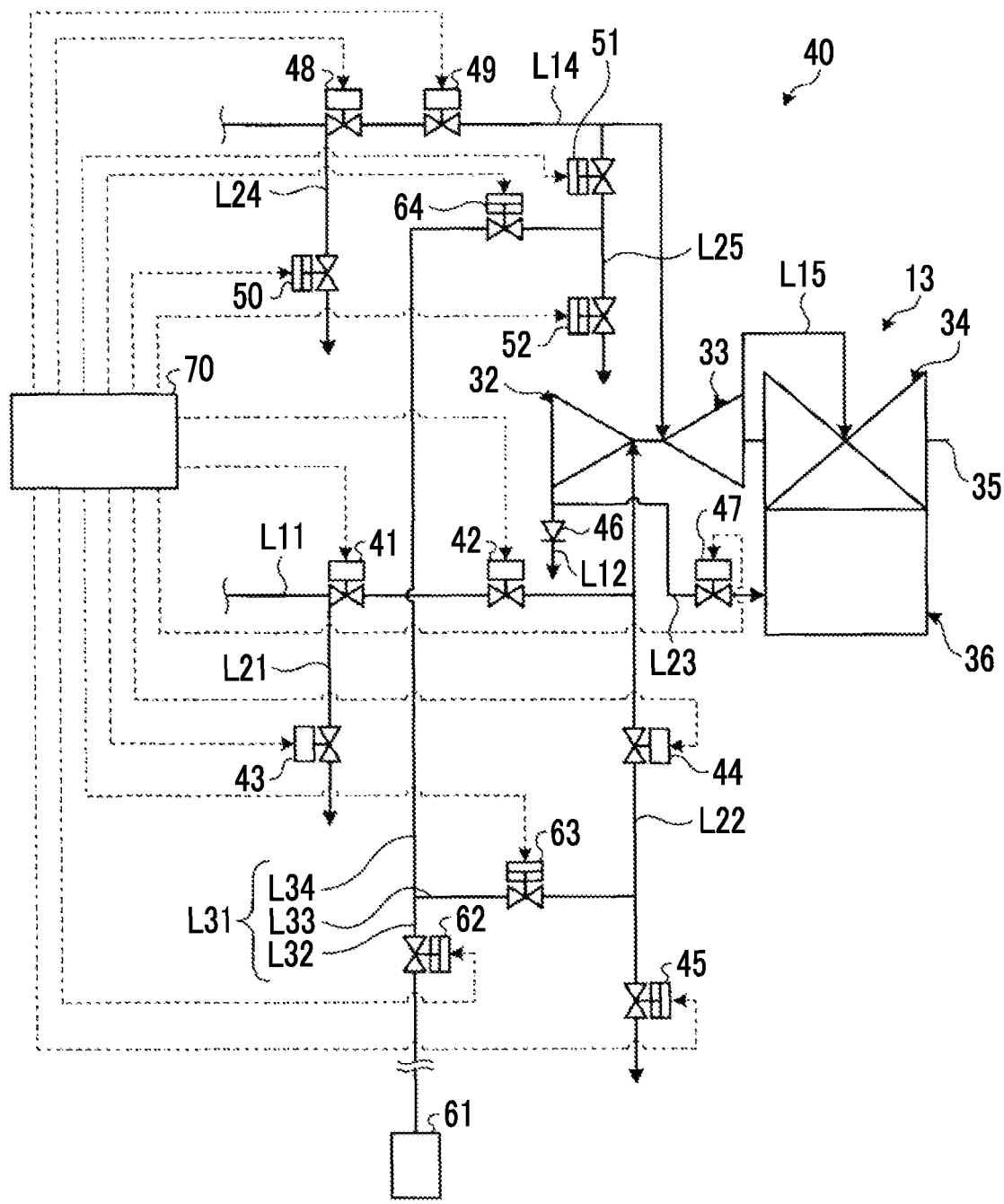
FIG. 2 is a schematic configuration diagram illustrating a steam turbine plant of the first embodiment.

Here, a steam turbine plant of the first embodiment will be described. FIG. 2 is a schematic configuration diagram illustrating the steam turbine plant of the first embodiment.

As illustrated in FIG. 2, in a steam turbine plant 40, the steam turbine 13 includes the turbine 31. The turbine includes the high-pressure turbine 32, the medium-pressure turbine 33, and the low-pressure turbine 34. The high-pressure turbine 32, the medium-pressure turbine 33, and the low-pressure turbine 34 are integrally rotatably connected to each other by the rotary shaft 35. The steam turbine 13 is a multi-axis type, and although not illustrated, the rotary shaft 35 is formed as a separate shaft separate from the rotary shaft 24 of the gas turbine 11 (refer to FIG. 1). The generators are connected to the gas turbine 11 and the steam turbine 13, respectively.

The high-pressure steam supply line L11 as a main steam supply line from the high-pressure superheater 25c of the high-pressure unit 25 of the heat recovery steam generator 12 (refer to FIG. 1) is connected to the high-pressure turbine 32. The high-pressure steam supply line L11 supplies the high-pressure steam to the high-pressure turbine 32. A main steam stop valve (MSV) 41 and a steam governing valve (GV) 42 as a control valve are provided in the high-pressure steam supply line L11 in order from an upstream side in a supply direction of the high-pressure steam. The high-pressure steam supply line L11 is provided with drain discharge line L21 from the main steam stop valve 41 to the condenser 36. The drain discharge line L21 is provided with a drain valve 43. The high-pressure supply line L11 is provided with a drain discharge line L22 from between the steam governing valve 42 and the high-pressure turbine 32 up to the condenser 36. The drain discharge line L22 is provided with a first drain valve 44 and a second drain valve 45.

In addition, the high-pressure turbine 32 is provided with the high-pressure steam recovery line L12 up to the repeater 28 of the heat recovery steam generator 12 (refer to FIG. 1). The high-pressure steam recovery line L12 allows the high-pressure steam, which has driven the high-pressure turbine 32, to return to the reheater 28. The high-pressure steam recovery line L12 is provided with a check valve 46, and is provided with a drain discharge line L23 from between the high-pressure turbine 32 and the check valve 46 up to the condenser 36. The drain discharge line L23 is provided with a drain valve 47.

The medium-pressure steam supply line L14 from the reheater 28 of the heat recovery steam generator 12 (refer to FIG. 1) is connected to the medium-pressure turbine 33. The medium-pressure steam supply line L14 supplies the medium-pressure steam to the medium-pressure turbine 33. A reheated steam stop valve (RSV) 48 and an intercept valve (ICV) 49 as a control valve are provided in the medium-pressure steam supply line L14 in order from an upstream side in a supply direction of the medium-pressure steam. The medium-pressure steam supply line L14 is provided with a drain discharge line L24 from the reheated steam stop valve 48 up to the condenser 36. The drain discharge line L24 is provided with a drain valve 50. The medium-pressure steam supply line L14 is provided with a drain discharge line L25 from between the intercept valve 49 and the medium-pressure turbine 33 up to the condenser 36. The drain discharge line L25 is provided with a first drain valve 51 and a second drain valve 52.

In addition, the medium-pressure turbine 33 is provided with a low-pressure steam supply line L15 up to the low-pressure turbine 34. The low-pressure steam supply line L15 supplies the low-pressure steam, which has driven the medium-pressure turbine 33, to the low-pressure turbine 34.

The steam turbine plant 40 of the first embodiment is provided with a first auxiliary steam supply line L31 that supplies auxiliary steam to the high-pressure turbine and the medium-pressure turbine 33. The first auxiliary steam supply line L31 includes an auxiliary steam master line L32, a high-pressure side auxiliary steam line L33, and a medium-pressure side auxiliary steam line L34. One end portion of the auxiliary steam master line L32 is connected to an auxiliary steam supply source 61. One end portion of the high-pressure side auxiliary steam line L33 is connected to the other end portion of the auxiliary steam supply source 61, and the other end portion of the high-pressure side auxiliary steam line L33 is connected between the first drain valve 44 and the second drain valve 45 of the drain discharge line L22. One end portion of the medium-pressure side auxiliary steam line L34 is connected to the other end portion of the auxiliary steam supply source 61, and the other end portion of the medium-pressure side auxiliary steam line L34 is connected between the first drain valve 51 and the second drain valve 52 of the drain discharge line L25 Namely, the first auxiliary steam supply line L31 includes the auxiliary steam master line L32 connected to the auxiliary steam supply source 61, and the high-pressure side auxiliary steam line L33 and the medium-pressure side auxiliary steam line L34 that branch from the auxiliary steam master line L32.

The auxiliary steam master line L32 is provided with an auxiliary steam master valve 62. The high-pressure side auxiliary steam line L33 is provided with an auxiliary steam supply valve 63. The medium-pressure side auxiliary steam line L34 is provided with an auxiliary steam supply valve 64. In addition, the auxiliary steam supply source 61 is an auxiliary boiler, another steam turbine plant, or the like not illustrated, and steam generated by the auxiliary boiler or main steam extracted from the another steam turbine plant is used as the auxiliary steam.

Therefore, the high-pressure side auxiliary steam line L33 of the first auxiliary steam supply line L31 is capable of supplying the auxiliary steam to the high pressure turbine 32 via the high-pressure steam supply line L11 on a downstream side of the steam governing valve 42. In addition, the medium-pressure side auxiliary steam line L34 of the first auxiliary steam supply line L31 is capable of supplying the auxiliary steam to the medium-pressure turbine 33 via the medium-pressure steam supply line L14 on a downstream side of the intercept valve 49. The low-pressure turbine 34 is not provided with the first auxiliary steam supply line.

A control device 70 is capable of controlling opening and closing of the main steam stop valve 41, the steam governing valve 42, the drain valve 43, the first drain valve 44, the second drain valve 45, the drain valve 47, the reheated steam stop valve 48, the intercept valve 49, the drain valve 50, the first drain valve 51, the second drain valve 52, the auxiliary steam master valve 62, the auxiliary steam supply valve 63, and the auxiliary steam supply valve 64.

In the first embodiment, before the start-up of the steam turbine plant, the high-pressure turbine 32 and the medium-pressure turbine 33 can be warmed up by using the first auxiliary steam supply line L31. The control device performs control such that the auxiliary steam is supplied from the first auxiliary steam supply line L31, the drain discharge line L22, and the high-pressure steam supply line L11 to the high-pressure turbine 32 before the drive timing of the gas turbine 11 and the heat recovery steam generator 12 as main steam generation sources. Tn addition, the control device 70 performs control such that the auxiliary steam is supplied from the first auxiliary steam supply line L31, the drain discharge line L25, and the medium-pressure steam supply line L14 to the medium-pressure turbine 33 before the drive timing of the gas turbine 11 and the heat recovery steam generator 12.

In this case, the control device 70 performs control such that after the auxiliary steam is supplied from the first auxiliary steam supply line L31 to the drain discharge lines L22 and L25 on second drain valve 45 and 52 sides to perform system warm-up, the auxiliary steam is supplied to the drain discharge lines L22 and L25 on first drain valve 44 and 51 sides to perform system warm-up, and is supplied to and warms up the high-pressure turbine 32 and the medium-pressure turbine 33.

Specifically, the control device 70 performs control such that the auxiliary steam is supplied to and warms up the high-pressure turbine 32 and the medium-pressure turbine 33 after the vacuum processing of the condenser 36 is completed. Then, the control device 70 performs control such that the supply of the auxiliary steam to the high-pressure turbine 32 and the medium-pressure turbine 33 is stopped before a condition for supplying the steam to the steam turbine 13 is satisfied and after a load as applied to the gas turbine 11.

Figure 3:
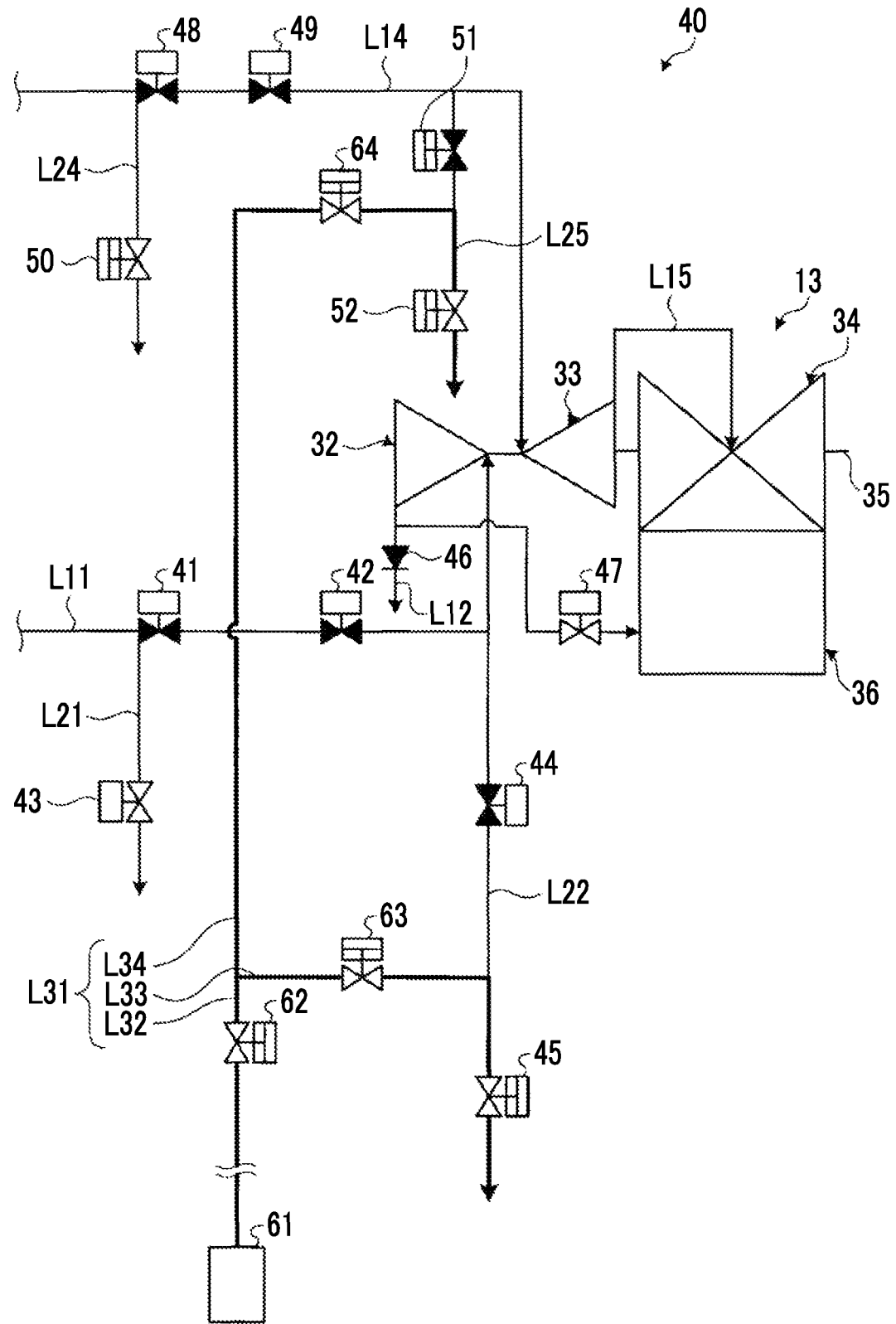
FIG. 3 is a schematic diagram illustrating a flow of steam during warm-up of system pipes.
Figure 4:
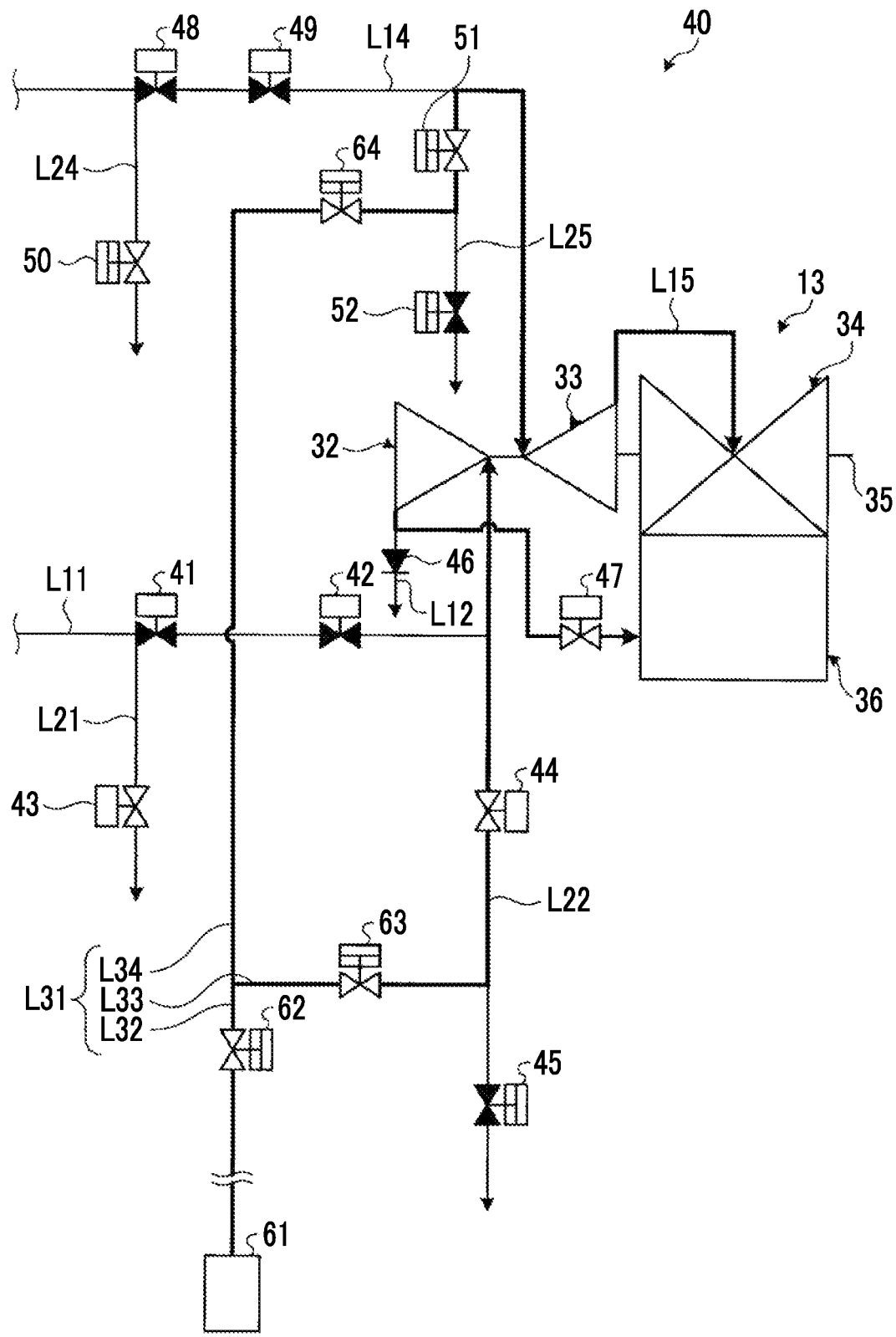
FIG. 4 is a schematic diagram illustrating the flow of steam during pre-warm-up of the steam turbine.
Figure 5:
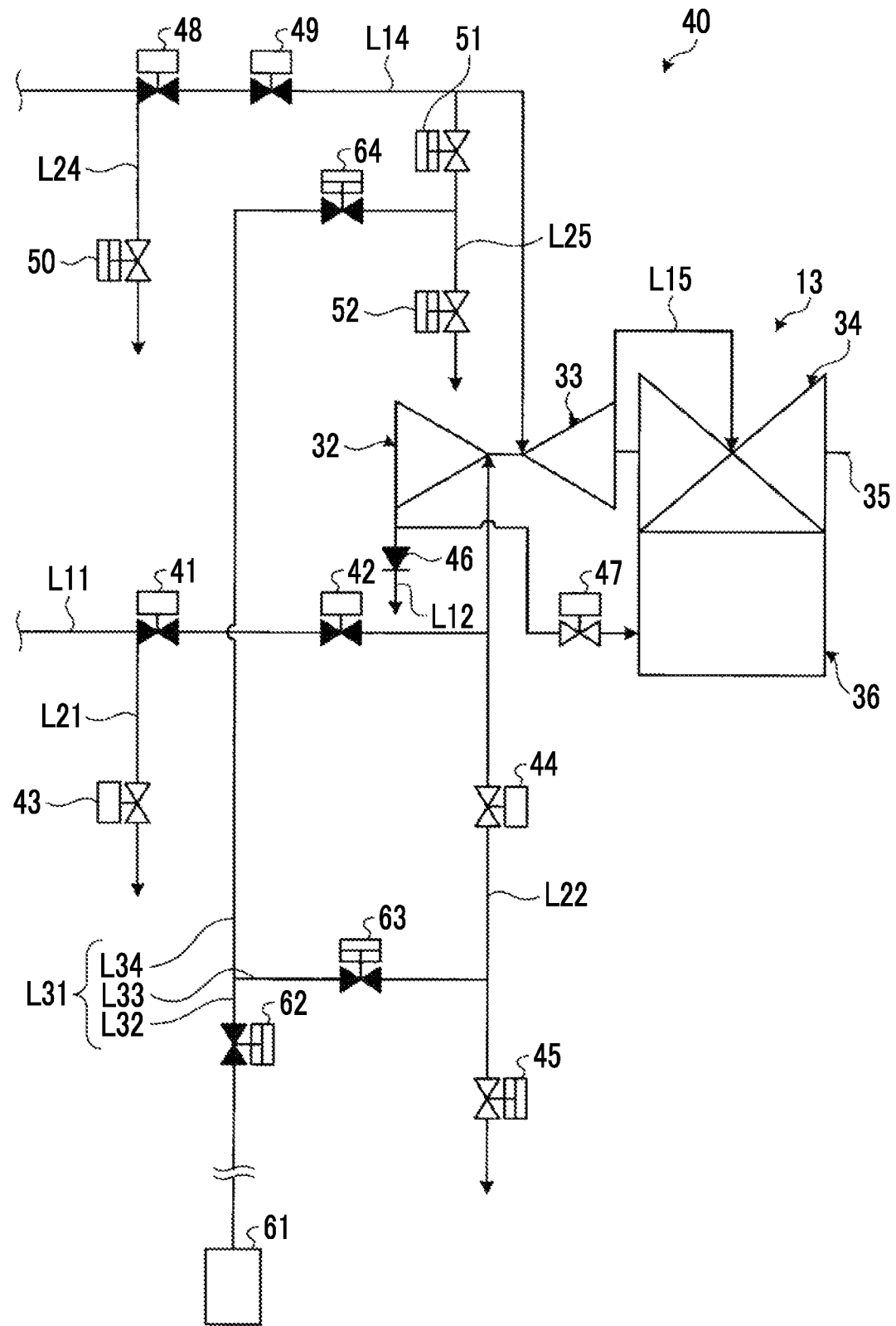
FIG. 5 is a schematic diagram illustrating the flow of steam at the completion of the pre-warm-up of the steam turbine.
Figure 6:
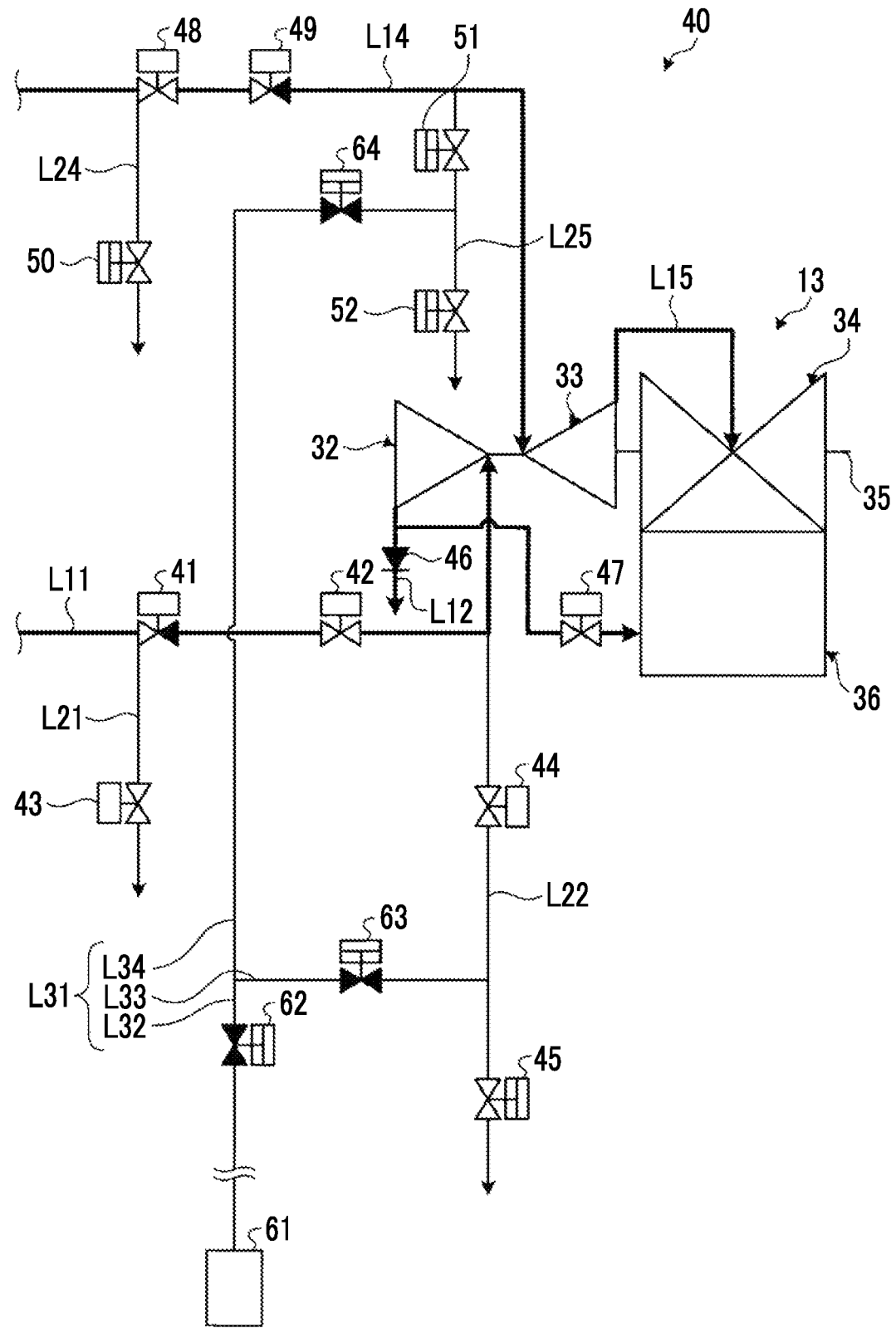
FIG. 6 is a schematic diagram illustrating the flow of steam after start-up of the steam turbine.

FIG. 3 is a schematic view illustrating the flow of steam during warm-up of system pipes. FIG. 4 is a schematic view illustrating the flow of steam during pre-warm-up of the steam turbine. FIG. 5 is a schematic view illustrating the flow of steam at the completion of the pre-warm-up of the steam turbine. FIG. 6 is a schematic view illustrating the flow of steam after start-up of the steam turbine.

First, as illustrated in FIG. 3, the main steam stop valve 41, the steam governing valve 42, the reheated steam stop valve 48, the intercept valve 49, and the first drain valves 44 and 51 are closed, and the second drain valves 45 and 52, the auxiliary steam master valve 62, and the auxiliary steam supply valves 63, 64, and 65 are opened. Then, the auxiliary steam of the auxiliary steam supply source 61 flows to the condenser 36 through the auxiliary steam master line L32, the high-pressure side auxiliary steam line L33, and the drain discharge line L22. Therefore, the auxiliary steam warms up the auxiliary steam master L32, the high-pressure side auxiliary steam line L33, and the system on a second drain valve 45 side of the drain discharge line L22. In addition, the auxiliary steam of the auxiliary steam supply source 61 flows to the condenser 36 through the auxiliary steam master line L32, the medium-pressure side auxiliary steam line L34, and the drain discharge line L25. Therefore, the auxiliary steam warms up the auxiliary steam master line L32, the medium-pressure side auxiliary steam line L34, and the system on a second drain valve 52 side of the drain discharge line L25.

Next, as illustrated in FIG. 4, the main steam stop valve 41, the steam governing valve 42, the reheated steam stop valve 46, the intercept valve 49, and the second drain valves 45 and 52 are closed, and the first drain valves 44 and 51, the auxiliary steam master valve 62, and the auxiliary steam supply valves 63 and 64 are opened. Then, the auxiliary steam of the auxiliary steam supply source 61 is supplied to the high-pressure turbine 32 through the auxiliary steam master line L32, the high-pressure side auxiliary steam line L33, the drain discharge line L22, and the high-pressure steam supply line L11. Therefore, the system on a first drain valve 44 side of the drain discharge line L22 and the high-pressure turbine 32 are pre-warmed up by the auxiliary steam. In addition, the auxiliary steam of the auxiliary steam supply source 61 is supplied to the medium-pressure turbine 33 through the auxiliary steam master line L32, the medium-pressure side auxiliary steam line L34, the drain discharge line L25, and the medium-pressure steam supply line L14. Therefore, the system on a first drain valve 51 side of the drain discharge line L25 and the medium-pressure turbine 33 are pre-warmed up by the auxiliary steam.

As illustrated in FIG. 5, when the high-pressure and medium-pressure system warm-up and the pre-warm-up of the high-pressure turbine 32 and the medium-pressure turbine 33 are completed, the main steam stop valve 41, the steam governing valve 42, the reheated steam stop valve 48, the intercept valve 49, the first drain valves 44 and 51, the second drain valves 45 and 52, the auxiliary steam master valve 62, and the auxiliary steam supply valves 63, 64, and 65 are closed.

Then, as illustrated in FIG. 6, the auxiliary steam master valve 62 and the auxiliary steam supply valves 63, 64, and 65 are closed, and the main steam stop valve 41, the steam governing valve 42, the reheated steam stop valve 48, the intercept valve 49, the first drain valves 44 and 51, and the second drain valves 45 and 52 are opened. Then, the high-pressure steam is supplied to the high-pressure turbine 32 through the high-pressure steam supply line L11. At this time, the main steam, stop valve 41 is opened by a predetermined opening degree, and the steam governing valve 42 is fully opened, and thus, when the high-pressure turbine 32 increases in speed and reaches a rated speed, the main steam stop valve 41 is fully opened, and the steam governing valve 42 is opened by a predetermined opening degree.

In addition, the medium-pressure steam is supplied to the medium-pressure turbine 33 through the medium-pressure steam supply line L14. At this time, the reheated steam stop valve 48 is fully opened, and the intercept valve 49 is opened by a predetermined opening degree.

Figure 7:
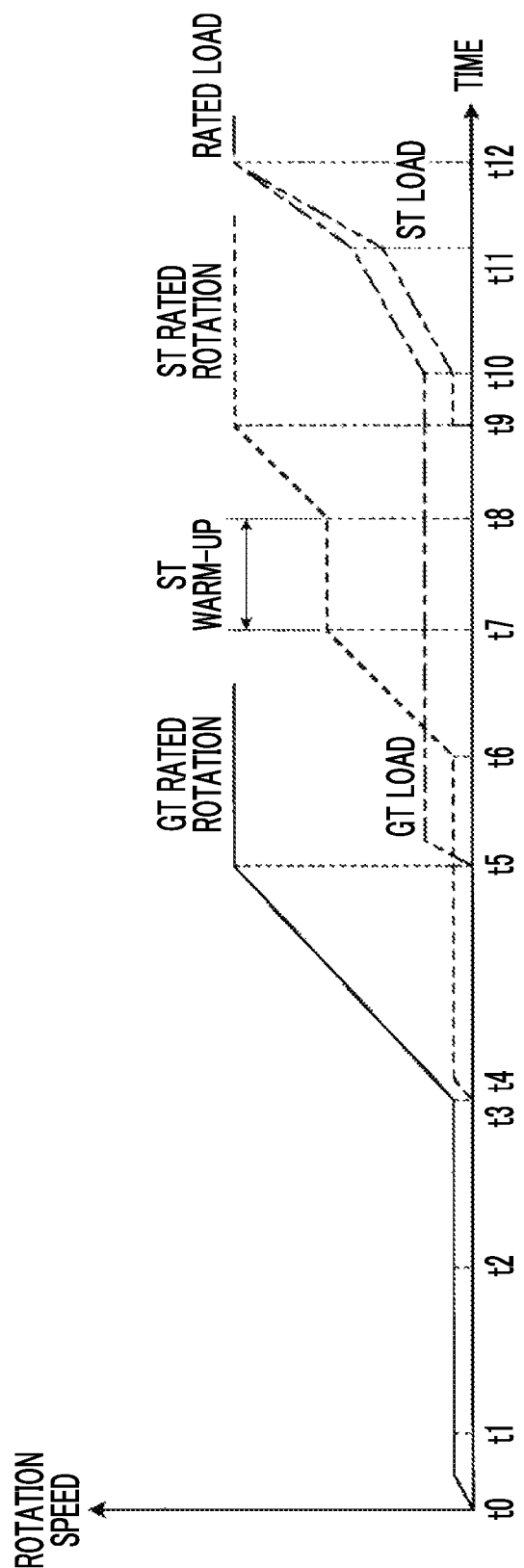
FIG. 7 is a timing chart illustrating an operation of a gas turbine and a steam turbine during start-up of a combined cycle plant in the related art.
Figure 8:
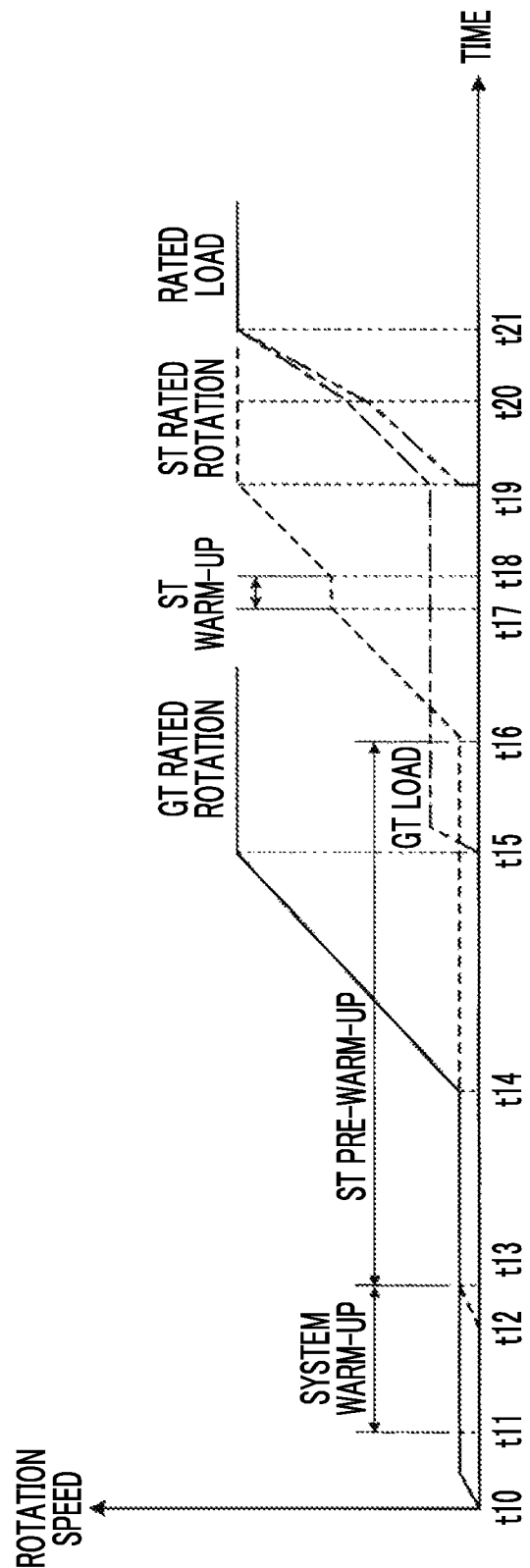
FIG. 8 is a timing chart illustrating the operation of a gas turbine and the steam turbine during start-up of the combined cycle plant of the present embodiment.

Here, a method for operating the combined cycle plant 10 will be described. FIG. 7 is a timing chart illustrating the operation of a gas turbine and a steam turbine during start-up of a combined cycle plant in the related art. FIG. 8 is a timing chart illustrating the operation of the gas turbine and the steam turbine during start-up of the combined cycle plant of the present embodiment. Here, GT represents the gas turbine, and ST represents the steam turbine.

In the combined cycle plant of the related art, as illustrated in FIGS. 1 and 7, at time t0, the turning of the Gas turbine 11 is started, and when the vacuum processing of the condenser 36 is started at time t1, at time t2, the vacuum processing of the condenser 36 is completed. At time t3, the turning of the steam turbine is started, and at time t4, the gas turbine 11 is ignited and started up. Then, the rotation speed of the gas turbine 11 increases, and at time t5, the gas turbine 11 reaches a rated rotation speed and is maintained at a constant rotation speed.

In addition, at time t5, the load on the as turbine increased and maintained at a constant load. Then, when the condition for supplying the steam to the steam turbine 13 is satisfied at time t6, the supply of the main steam to the steam turbine 13 is started. Then, the rotation speed of the steam turbine 13 increases, and when the rotation speed of the steam turbine 13 reaches a predetermined rotation speed at time t7, the rotation speed is maintained at a constant rotation speed, and the warm-up of the steam turbine 13 is started. Then, when the temperature of the steam turbine reaches a predetermined temperature at time t8, the warm-up of the steam turbine 13 is completed, and the rotation speed of the steam turbine 13 is increased. When the steam turbine 13 reaches a rated rotation speed at time t9, the steam turbine 13 is maintained at a constant rotation speed, and a load is applied to the steam turbine 13.

Thereafter, at time t10, the load on the gas turbine and the steam turbine 13 is increased at a predetermined change rate, and at time t11, the change rate of the load on the gas turbine 11 and the steam turbine 13 is increased. Then, when the load on the gas turbine 11 and the steam turbine 13 reaches a rated load at time t12, the load is maintained at a constant load.

Meanwhile, in the combined cycle plant 10 of the first embodiment, as illustrated in FIGS. 1 and 8, at time t10, the turning of the gas turbine 11 is started, and when the vacuum processing of the condenser 36 is started at time t11, at time t13, the vacuum processing of the condenser 36 is completed. At this time, as illustrated in FIG. 3, the auxiliary steam is supplied to the second drain valve 45 and 52 sides of the drain discharge lines L22 and L25 by the first auxiliary steam supply line L31, and the system warm-up is started. In addition, at time t13 the vacuum processing of the condenser 36 is completed, as illustrated in FIG. 4, the auxiliary steam is supplied to the high-pressure turbine 32 and the medium-pressure turbine 33 via the drain discharge lines L22 and L25, the high-pressure steam supply line L11, and the medium-pressure steam supply line L14 by the first auxiliary steam supply line L31, and the ST pre-warm-up of the high-pressure turbine 32 and the medium-pressure turbine 33 is started.

Returning to FIGS. 1 and 8, at time t12, the turning of the steam turbine 13 is started, and at time t14, the gas turbine 11 is ignited and started up. Then, the rotation speed of the gas turbine 11 increases, and at time t15, the gas turbine 11 reaches a rated rotation speed and is maintained at a constant rotation speed in addition, at time t15, the load on the gas turbine 11 is increased and maintained at a constant load. Then, when the condition for supplying the steam to the steam turbine 13 is satisfied at time t16, the ST pre-warm-up is stopped, and the supply of the main steam to the steam turbine 13 is started. Then, the rotation speed of the steam turbine increases, and when the rotation speed of the steam turbine 13 reaches a predetermined rotation speed at time t17, the rotation speed is maintained at a constant rotation speed, and the warm-up of the steam turbine 13 is started. Then, when the temperature of the steam turbine reaches a predetermined temperature at time t18, the warm-up of the steam turbine 13 is completed, and the rotation speed of the steam turbine 13 is increased. When the steam turbine 13 reaches a rated rotation speed at time t19, the steam turbine 13 is maintained at a constant rotation speed, and a load is applied to the steam turbine 13. In this case, since the system warm-up is performed from time t11 to time t13 and the ST pre-warm-up is performed from time t13 to time t16, the metal temperature of the steam turbine 13 increases, so that the ST warm-up time can be shortened more than in the related art. In addition, the ST warm-up time can be eliminated depending on the capacity of the steam turbine 13.

In addition, at time t19, the load on the gas turbine 11 and the steam turbine 13 is increased at a predetermined change rate, and at time t20, the change rate of the load on the gas turbine 11 and the steam turbine 13 is increased. Then, when the load on the gas turbine 11 and the steam turbine 13 reaches a rated load at time t21, the load is maintained at a constant load. In this case, since the ST pre-warm-up is performed, the metal temperature of the steam turbine 13 is a high temperature, and the predetermined change rate of the load on the gas turbine 11 and the steam turbine 13 can be increased more than in the related art. Therefore, the time required for the load on the gas turbine 11 and the steam turbine 13 to reach the rated load can be shortened.

As described above, the steam turbine plant of the first embodiment includes the steam supply lines L11 and L14 that supply the main steam to the turbine 31; the steam governing valve 42 and the intercept valve 49 provided in the steam supply lines L11 and L14, respectively; and the first auxiliary steam supply line L31 that supplies the auxiliary steam to the turbine 31 via the steam supply lines L11 and L14 on the downstream sides of the steam governing valve 42 and the intercept valve 49.

Therefore, the auxiliary steam can be supplied to the turbine 31 via the steam supply lines L11 and L14 by the first auxiliary steam supply line L31, and before the start-up of the steam turbine 13, the auxiliary steam can be supplied to and can pre-warm up the turbine 31, and the start-up time of the steam turbine 13 can be shortened to secure a required amount of electric power at an early stage. Namely, since the turbine 31 is pre-warmed up by the auxiliary steam during the preparation time for starting up the gas turbine 11, the dedicated warm-up time for warming up the turbine 31 can be shortened or eliminated, and the start-up time of the steam turbine 13 can be shortened.

In the steam turbine plant of the first embodiment, the control device 70 performs control such that the auxiliary steam is supplied from the first auxiliary steam supply line L31 and the steam supply lines L11 and L14 to the turbine 31 before the drive timing (ignition timing) of the gas turbine 11. Therefore, the steam turbine 13 can be pre-warmed up by the auxiliary steam, and the warm-up time of the steam turbine 13 can be shortened to shorten the start-up time.

In the steam turbine plant of the first embodiment, the drain discharge lines L22 and L25 are provided between the turbine 31 and the steam governing valve 42 and between the turbine 31 and the intercept valve 49 in the steam supply lines L11 and L14, respectively, and the first auxiliary steam supply line L31 is connected to the drain discharge lines L22 and L25. Therefore, when the auxiliary steam is supplied to and pre-warms up the turbine 31, generated drain can be easily discharged from the drain discharge lines L22 and L25.

In the steam turbine plant of the first embodiment, the first drain valves 44 and 51 are provided in the drain discharge lines L22 and L25 on turbine 31 sides with respect to connecting portions of the first auxiliary steam supply line L31, respectively. The second drain valves 52 and 45 are provided on sides opposite the turbine 31. The control device 70 performs control such that the auxiliary steam is supplied to the second drain valve 52 and 45 sides before the drive timing (ignition timing) of the gas turbine 11, and then is supplied to the first drain valve 51 and 44 sides. Therefore, the systems on the second drain valve 52 and 45 sides of the drain discharge lines L25 and L22 can be warmed up by closing the first drain valves 51 and 44 and opening the second drain valves 52 and 45, and the systems on the first drain valve 44 and 51 sides of the drain discharge lines L22 and L25 and the turbine 31 can be warmed up by opening the first drain valves 44 and 51 and the closing the second drain valves 45 and 52.

In the steam turbine plant of the first embodiment, the drain discharge lines L22 and L25 are connected to the condenser 36. Therefore, the drain generated in the drain discharge lines L22 and L25 and the turbine 31 can be recovered by the condenser 36 and recirculated.

In the steam turbine plant of the first embodiment, the high-pressure turbine 32, the medium-pressure turbine 33, and the low-pressure turbine 34 are provided as the turbine 31, and the first auxiliary steam supply line L31 is disposed with respect to the high-pressure turbine 32 and the medium-pressure turbine 33. Therefore, the auxiliary steam is supplied to the high-pressure turbine 32 and the medium-pressure turbine 33, so that before the start-up of the steam turbine 13, the high-pressure turbine 32 and the medium-pressure turbine 33 can be pre-warmed up, and the start-up time of the steam turbine 13 can be shortened.

In the steam turbine plant of the first embodiment, the control device 70 performs control such that the auxiliary steam is supplied from the first auxiliary steam supply line L31 to the turbine 31 after the vacuum processing of the condenser 36 is completed. Therefore, drain recovered by the condenser 36 can be quickly processed.

In the steam turbine plant of the first embodiment, the control device 70 performs control such that the supply of the auxiliary steam to the turbine 31 is stopped when or before the condition for supplying the steam to the turbine 31 is satisfied. Therefore, the main steam can be supplied to the steam supply lines L11 and L14, and the steam turbine 13 can be started up properly.

In the steam turbine plant of the first embodiment, the control device 70 performs control such that the supply of the auxiliary steam to the turbine 31 is stopped after a load is applied to the gas turbine 11. Therefore, the main steam which has increased in temperature can be supplied to the steam supply lines L11 and L14, and the steam turbine 13 can be started up properly.

In addition, the method for operating the steam turbine plant in the first embodiment includes a step of supplying the auxiliary steam to the turbine 31 from the downstream sides of the steam governing valve 42 and the intercept valve 49, which are provided in the steam supply lines L11 and L14, respectively, before the drive timing of the gas turbine 11; a step of stopping the supply of the auxiliary steam to the turbine 31 when or before the condition for supplying the steam to the turbine 31 is satisfied; and a step of starting the supply of the main steam to the turbine 31 when the condition for supplying the steam to the turbine 31 is satisfied after the supply of the auxiliary steam to the turbine 31 is stopped.

Therefore, before the start-up of the steam turbine 13, the auxiliary steam can be supplied to and can pre-warm up the turbine 31, and the start-up time of the steam turbine 13 can be shortened to secure a required amount of electric power at an early stage.

In addition, in the combined cycle plant of the first embodiment, the steam turbine plant 40 includes the gas turbine 11 including the compressor 21, the combustor 22, and the turbine 23; the heat recovery steam generator that uses waste heat of the flue gas from the gas turbine 11 to generate the steam; and the steam turbine 13 driven by the steam generated by the heat recovery steam generator 12.

Therefore, before the start-up of the steam turbine 13, the auxiliary steam can be supplied to and can pre-warm up the turbine 31, and the start-up time of the steam turbine 13 can be shortened to secure a required amount of electric power at an early stage.

Second Embodiment

Figure 9:
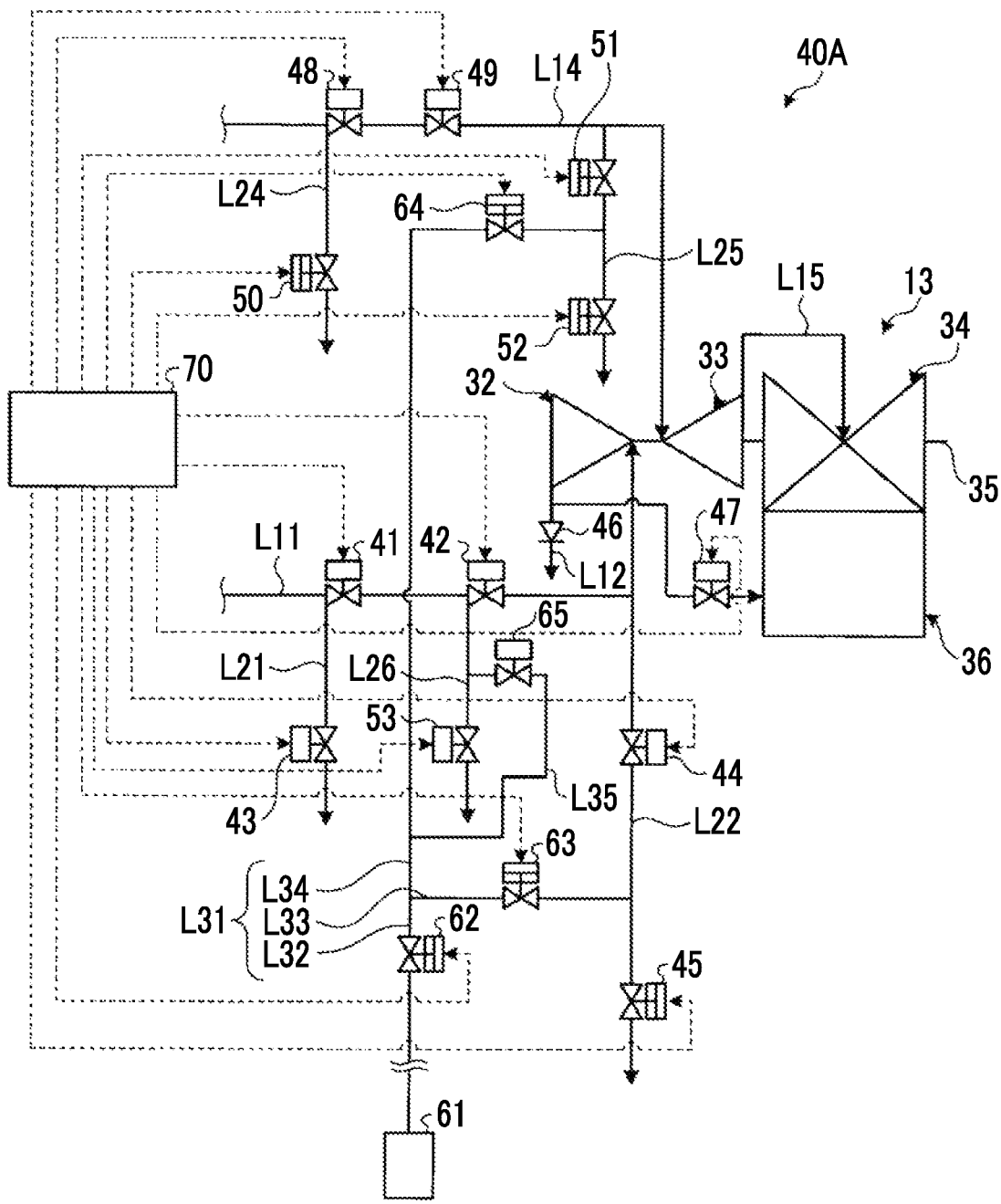
FIG. 9 a schematic configuration diagram illustrating a steam turbine plant of a second embodiment.

FIG. 9 is a schematic configuration diagram illustrating a steam turbine plant of a second embodiment. Members having the same functions as those in the above-described embodiment are denoted by the same reference signs, and a detailed description thereof will be omitted.

In the second embodiment, as illustrated in FIG. 9, the steam turbine 13 includes the turbine 31. The turbine includes the high-pressure turbine 32, the medium-pressure turbine 33, and the low-pressure turbine 34. The high-pressure turbine 32, the medium-pressure turbine 33, and the low-pressure turbine 34 are integrally rotatably connected to each other by the rotary shaft 35. The steam turbine 13 is a single-axis type, and although not illustrated, the rotary shaft 35 is disposed on a straight line with the rotary shaft 24 of the gas turbine 11 (refer to FIG. 1) and is connected thereto as an integral shaft. A common generator is connected to the gas turbine 11 and the steam turbine 13.

The high-pressure steam supply line L11 is connected to the high-pressure turbine 32, and the high-pressure steam is supplied thereto by the high-pressure steam supply line L11. The high-pressure steam supply line L11 is provided with the main steam stop valve 41 and the steam governing valve 42. The high-pressure steam supply line L11 is provided with a drain discharge line L26 from the steam governing valve 42 up to the condenser 36. The drain discharge line L26 is provided with a drain valve 53.

A steam turbine plant 40A of the second embodiment is provided with the first auxiliary steam supply line L31 that supplies the auxiliary steam to the high-pressure turbine 32 and the medium-pressure turbine 33. In addition, the steam turbine plant 40A is provided with a second auxiliary steam supply line L35 that supplies the auxiliary steam to the steam governing valve 42. One end portion of the second auxiliary steam supply line L35 is connected to the medium-pressure side auxiliary steam line L34, and the other end portion thereof is connected between the steam governing valve 42 and the drain valve 53 in the drain discharge line L26. The second auxiliary steam supply line L35 is provided with an auxiliary steam supply valve 65.

Therefore, the second auxiliary steam supply line L35 is capable of supplying the auxiliary steam to the high-pressure turbine 32 via the steam governing valve 42 and the high-pressure steam supply line L11.

The control device 70 is capable of controlling opening and closing of the main steam stop valve 41, the steam governing valve 42, the drain valve 43, the first drain valve 44, the second drain valve 45, the drain valve 47, the reheated steam stop valve 48, the intercept valve 49, the drain valve 50, the first drain valve 51, the second drain valve 52, the drain valve 53, the auxiliary steam master valve 62, the auxiliary steam supply valve 63, the auxiliary steam supply valve 64, and the auxiliary steam supply valve 65.

In the second embodiment, before the start-up of the steam turbine plant, the high-pressure turbine 32 and the medium-pressure turbine 33 can be warmed up by using the first auxiliary steam supply line L31. The control device 70 performs control such that the auxiliary steam is supplied from the first auxiliary steam supply line L31, the drain discharge line L22, and the high-pressure steam supply line L11 to the high-pressure turbine 32 before the drive timing of the gas turbine 11 and the heat recovery steam generator 12 as main steam generation sources. In addition, the control device 70 performs control such that the auxiliary steam is supplied from the first auxiliary steam supply line L31, the drain discharge line L25, and the medium-pressure steam supply line L14 to the medium-pressure turbine 33 before the drive timing of the gas turbine 11 and the heat recovery steam generator 12.

In this case, the control device 70 performs control such that after the auxiliary steam is supplied from the first auxiliary steam supply line L31 to the drain discharge lines L22 and L25 on second drain valve 45 and 52 sides to perform system warm-up, the auxiliary steam is supplied to the drain discharge lines L22 and L25 on first drain valve 44 and 51 sides to perform system warm-up, and is supplied to and warms up the high-pressure turbine 32 and the medium-pressure turbine 33. At this time, the control device 70 performs control such that the auxiliary steam is supplied from the second auxiliary steam supply line L35 to the steam governing valve 42.

Figure 10:
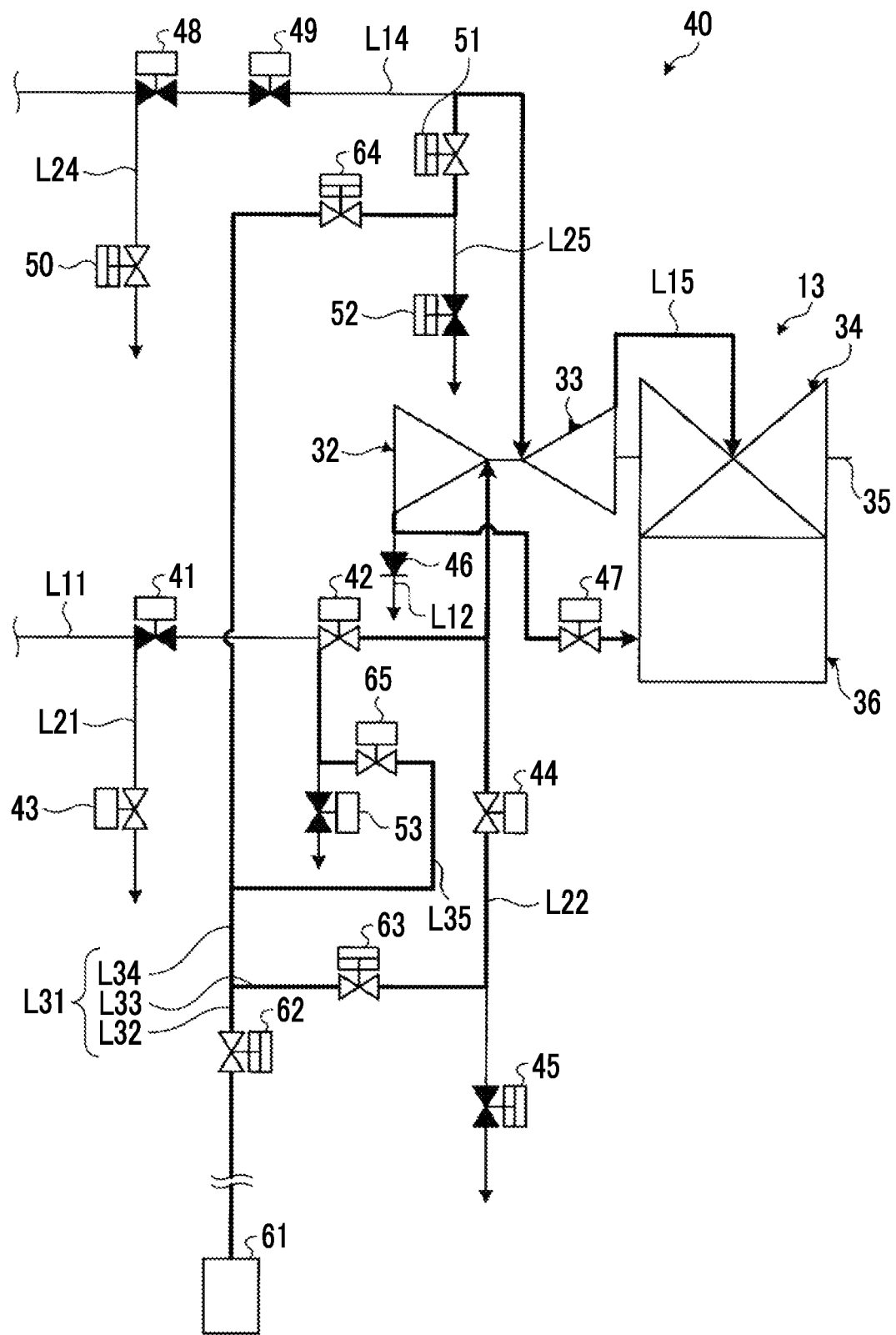
FIG. 10 is a schematic diagram illustrating the flow of steam during pre-warm-up.

FIG. 10 is a schematic view illustrating the flow of the steam during pre-warm-up.

A process of warming up the auxiliary steam master line L32, the high-pressure side auxiliary steam line L33, and the system on the second drain valve 45 side of the drain discharge line L22 using the auxiliary steam, and a process of warming up the auxiliary steam master line L32, the medium-pressure side auxiliary steam line L34, and the system on the second drain valve 52 side of the drain discharge line L25 using the auxiliary steam are the same as those in the first embodiment, so that a description thereof will be omitted.

Next, as illustrated in FIG. 10, the main steam stop valve 41, the reheated steam stop valve 48, the intercept valve 49, the second drain valves 45 and 52, and the drain valve 53 are closed, and the steam governing valve 42, the first drain valves 44 and 51, the auxiliary steam master valve 62, and the auxiliary steam supply valves 63, 64, and 65 are opened. Then, the auxiliary steam of the auxiliary steam supply source 61 is supplied to the high-pressure turbine 32 through the auxiliary steam master line L32, the high-pressure side auxiliary steam line L33, the drain discharge line L22, and the high-pressure steam supply line. Therefore, the system on a first drain valve 44 side of the drain discharge line L22 and the high-pressure turbine 32 are pre-warmed up by the auxiliary steam. In addition, the auxiliary steam of the auxiliary steam supply source 61 is supplied to the medium-pressure turbine 33 through the auxiliary steam master line L32, the medium-pressure side auxiliary steam line L34, the drain discharge line L25, and the medium-pressure steam supply line L14. Therefore, the system on a first drain valve 51 side of the drain discharge line L25 and the medium-pressure turbine 33 are pre-warmed up by the auxiliary steam.

In addition, the auxiliary steam of the medium-pressure side auxiliary steam line L34 is supplied to the steam governing valve 42 through the second auxiliary steam supply line L35, and then is supplied to the high-pressure turbine 32 through the high-pressure steam supply line L11. Therefore, the steam governing valve 42 is pre-warmed by the auxiliary steam.

Figure 11:
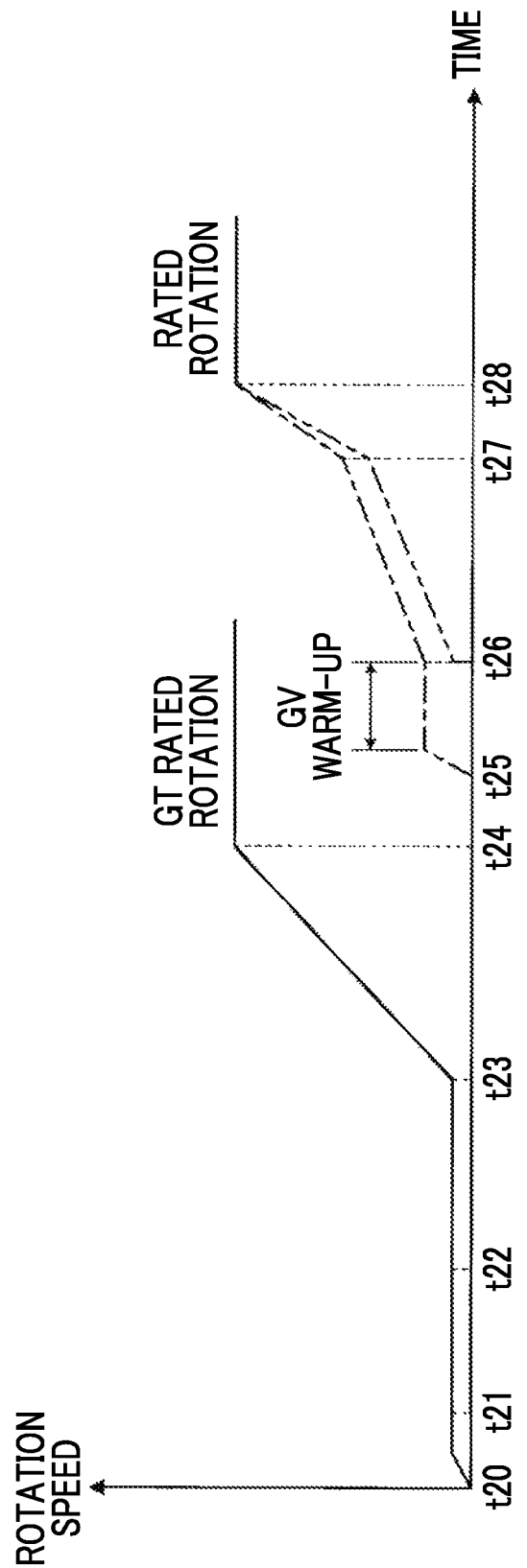
FIG. 11 is a timing chart illustrating the operation of the gas turbine and the steam turbine during start-up of the combined cycle plant in the related art.
Figure 12:
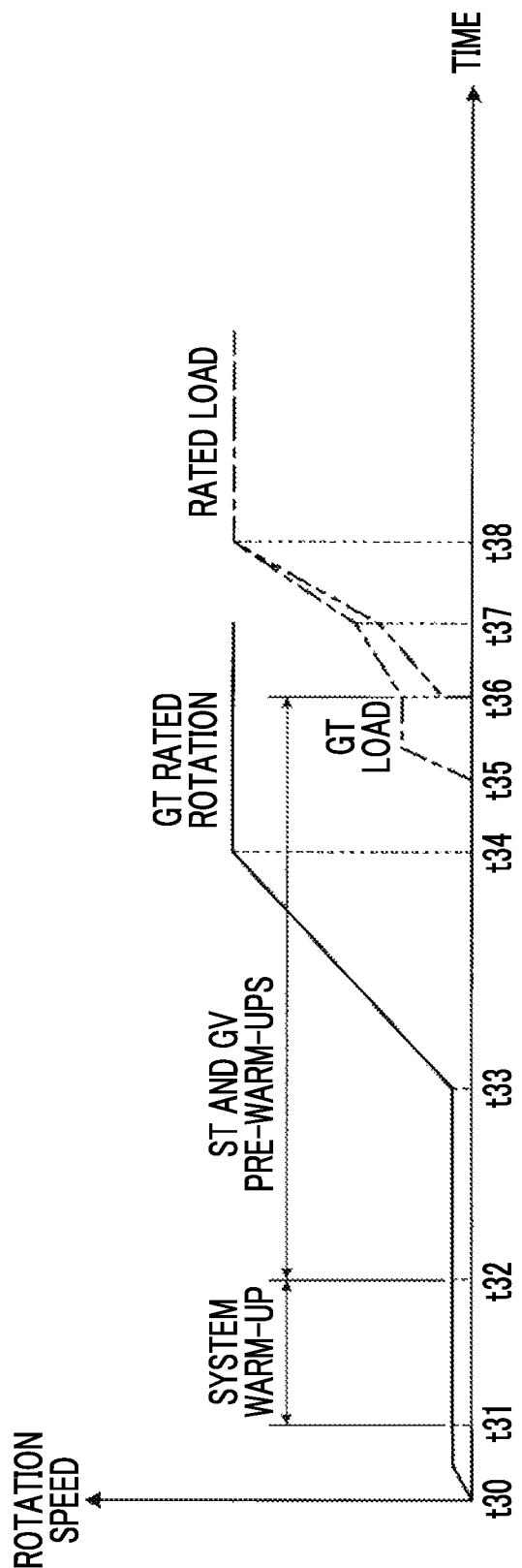
FIG. 12 is a timing chart illustrating the operation of the gas turbine and the steam turbine during start-up of the combined cycle plant of the present embodiment.

Here, a method for operating the combined cycle plant 10 will be described. FIG. 11 is a timing chart illustrating the operation of the gas turbine and the steam turbine during start-up of the combined cycle plant in the related art. FIG. 12 is a timing chart illustrating the operation of the gas turbine and the steam turbine during start-up of the combined cycle plant of the present embodiment. Here, GT represents the gas turbine, ST represents the steam turbine, and GV represents the steam governing valve.

In the combined cycle plant of the related art, as illustrated in FIGS. 1 and 11, at time t20, the turning of the gas turbine 11 is started. In this case, since the gas turbine 11 and the steam turbine 13 are coaxial with each other and rotate integrally, the turning of the steam turbine 13 is started. When the vacuum processing or the condenser 36 is started at time t21, at time t22, the vacuum processing of the condenser 36 is completed time t23, the gas turbine 11 is ignited and started up. Then, the rotation speed of the gas turbine 11 increases, and at time t24, the gas turbine 11 reaches a rated rotation speed and is maintained at a constant rotation speed.

In addition, at time t25, the load on the gas turbine 11 is increased and maintained at a constant load. At this time, the warm-up (GV warm-up) of the steam governing valve 42 is started. Then, when the GV warm-up is completed and a condition for supplying the steam to the steam turbine 13 is satisfied at time t26, the supply of the main steam to the steam turbine 13 is started, the load on the gas turbine 11 and the steam turbine 13 is increased at a predetermined change rate, and at time t27, the change rate of the load on the gas turbine 11 and the steam turbine 13 is increased. Then, when the load on the gas turbine 11 and the steam turbine 13 reaches a rated load at time t28, the load is maintained at a constant load.

Meanwhile, in the combined cycle plant 10 of the second embodiment, as illustrated in FIGS. 1 and 12, at time t30, the turning of the as turbine 11 is started. In this case, since the gas turbine 11 and the steam turbine 13 are coaxial with each other and rotate integrally, the turning of the steam turbine 13 is started. When the vacuum processing of the condenser 36 is started at time t31, at time t32, the vacuum processing of the condenser 36 is completed. At this time, as illustrated in FIG. 9, the auxiliary steam is supplied to the second drain valve 45 and 52 sides of the drain discharge lines L22 and L25 by the first auxiliary steam supply line L31, and the system warm-up is started. In addition, at time t32, the vacuum processing of the condenser 36 is completed, as illustrated in FIG. 10, the auxiliary steam is supplied to the high-pressure turbine 32 and the medium-pressure turbine 33 via the drain discharge lines L22 and L25, the high-pressure steam supply line L11, and the medium-pressure steam supply line L14 by the first auxiliary steam supply line L31, and the ST pre-warm-up of the high-pressure turbine 32 and the medium-pressure turbine 33 is started. In addition, the auxiliary steam is supplied to the steam governing valve 42 by the second auxiliary steam supply line L35, and the pre-warm-up of the steam governing valve 42 is started.

Returning to FIGS. 1 and 12, at time t33, the gas turbine 11 is ignited and started up. Then, the rotation speed of the gas turbine 11 increases, and at time t34, the gas turbine 11 reaches a rated rotation speed and is maintained at a constant rotation speed. In addition, at time t35, the load on the gas turbine 11 is increased and maintained at a constant load. In this case, since the ST pre-warm-up and the GV pre-warm-up has been performed from time t32 to time t36, it is not necessary to perform the GV warm-up. When the ST pre-warm-up and the GV warm-up are completed and the condition for supplying the steam to the steam turbine 13 is satisfied at time t36, the supply of the main steam to the steam turbine 13 is started, and a load is applied to the gas turbine 11 and the steam turbine 13.

At time t36, the load on the gas turbine 11 and the steam turbine 13 is increased at a predetermined change rate, and at time t37, the change rate of the load on the gas turbine 11 and the steam turbine 13 is increased. Then, when the load on the gas turbine 11 and the steam turbine 13 reaches a rated load at time t38, the load is maintained at a constant load. In this case, since the ST pre-warm-up is performed, the metal temperature of the steam turbine 13 is a high temperature, and the predetermined change rate of the load on the gas turbine 11 and the steam turbine 13 can be increased more than in the related art. Therefore, the time required for the load on the gas turbine 11 and the steam turbine 13 to reach the rated load can be shortened.

As described above, in the steam turbine plant of the second embodiment, the second auxiliary steam supply line L35 is provided which supplies the auxiliary steam to the steam governing valve 42 and the intercept valve 49, and the control device 70 performs control such that when the auxiliary steam is supplied to the turbine 31 by the first auxiliary steam supply line L31, the auxiliary steam is supplied to the steam governing valve 42 and the intercept valve 49 by the second auxiliary steam supply line L35.

Therefore, before the start-up of the steam turbine 13, the auxiliary steam can be supplied to and can pre-warm up the steam governing valve 42 and the intercept valve 49, and the start-up time of the steam turbine 13 can be shortened.

In the above-described embodiments, the high-pressure turbine 32, the medium-pressure turbine 33, and the low-pressure turbine 34 form the turbine 31, and the auxiliary steam is supplied to the high-pressure turbine and the medium-pressure turbine 33 by the first auxiliary steam supply line L31; however, the present invention is not limited to this configuration, and the auxiliary steam may be supplied only to the high-pressure turbine 32 by the first auxiliary steam supply line L31. In addition, for example, the high-pressure turbine and the low-pressure turbine may form the turbine, and the auxiliary steam may be supplied only to the high-pressure turbine by the first auxiliary steam supply line.

In addition, in the above-described embodiments, the steam turbine plant of the present invention has been described as being applied to the combined cycle plant; however, for example, the steam turbine plant of the present invention may be applied to a thermal power plant combined with a conventional boiler. In this case, the main steam generation source is the conventional boiler, and the drive timing is the ignition timing of the conventional boiler.

REFERENCE SIGNS LIST

10: Combined cycle plant
11: Gas turbine
12: Heat recovery steam generator
13: Steam turbine
14, 15: Generator
21: Compressor
22: Combustor
23: Turbine
24: Rotary shaft
25: High-pressure unit
26: Medium-pressure unit
27: Low-pressure unit
28: Reheater
29: Fuel heater (second heat exchanger)
31: Turbine
32: High-pressure turbine
33: Medium-pressure turbine
34: Low-pressure turbine
35: Rotary shaft
36: Condenser
37: Condensate pump
40, 40A: Steam turbine plant
41: Main steam stop valve
42: Steam governing valve (control valve)
43, 47, 50, 53: Drain valve
44, 51: First drain valve
45, 52: Second drain valve
46: Check valve
48: Reheated steam stop valve
49: Intercept valve (control valve)
61: Auxiliary steam supply source
62: Auxiliary steam master valve
63, 64, 65: Auxiliary steam supply valve
70: Control device
L1: Air intake line
L2: Compressed air supply line
L3: Fuel gas supply line
L4: Combustion gas supply line
L5: Flue gas discharge line
L10: Medium-pressure supply water line
L11: High-pressure steam supply line (main steam supply line)
L12: High-pressure steam recovery line
L13: High-pressure steam circulation line
L14: Medium-pressure steam supply line
L15: Low-pressure steam supply line
L16: Condensate supply line
L17: Cooling water line
L21, L22, L23, L24, L25, L26: Drain discharge line
L31: First auxiliary steam supply line
L32: Auxiliary steam master line
L33: High-pressure side auxiliary steam line
L34: Medium-pressure side auxiliary steam line
L35: Second auxiliary steam supply line

The invention claimed is:

1. A steam turbine plant comprising:
a turbine;
a main steam supply line that supplies main steam to the turbine;
a control valve provided in the main steam supply line; and
a first auxiliary steam supply line that supplies auxiliary steam to the turbine via the main steam supply line on a downstream side of the control valve,
wherein a drain discharge line is provided between the turbine and the control valve in the main steam supply line, and the first auxiliary steam supply line is connected to the drain discharge line at a connecting portion, and wherein drain valves are provided in the drain discharge line on an upstream side and a downstream side of the connecting portion, respectively.

2. The steam turbine plant according to claim 1, wherein the drain discharge line is connected to a condenser.

3. The steam turbine plant according to claim 1, wherein the turbine includes
a high and medium-pressure turbine of which one end portion in an axial direction is provided with a high-pressure turbine portion and of which the other end portion is provided with a medium-pressure turbine portion, and
a low-pressure turbine disposed coaxially with the high and medium-pressure turbine, and
wherein the first auxiliary steam supply line is disposed to supply the auxiliary steam to the high-pressure turbine portion and the medium-pressure turbine portion.

4. The steam turbine plant according to claim 1, wherein a second auxiliary steam supply line is provided which supplies the auxiliary steam to the turbine via the control valve and the main steam supply line.

5. The steam turbine plant according to claim 1, further comprising:
a control device which performs control such that the auxiliary steam is supplied from the first auxiliary steam supply line and the main steam supply line to the turbine before a drive timing of a main steam generation source.

6. The steam turbine plant according to claim 5, wherein the control device performs control such that the auxiliary steam is supplied from the first auxiliary steam supply line and the main steam supply line to the turbine after vacuum processing of a condenser is completed.

7. The steam turbine plant according to claim 5, wherein the control device performs control such that a supply of the auxiliary steam to the turbine is stopped when or before a condition for supplying steam to the turbine is satisfied.

8. The steam turbine plant according to claim 5, wherein the control device performs control such that a supply of the auxiliary steam to the turbine is stopped after a load is applied to the main steam generation source.

9. The steam turbine plant according to claim 5, wherein the drain valves include a first drain valve which is provided in the drain discharge line on a turbine side of the connecting portion, and a second drain valve which is provided in the drain discharge line on an opposite side of the connecting portion with respect to the first drain valve, and
wherein the control device performs control such that the auxiliary steam is supplied to a second drain valve side of the drain discharge line before the drive timing of the main steam generation source, and is then supplied to a first drain valve side of the drain discharge line.

10. The steam turbine plant according to claim 9, wherein a second auxiliary steam supply line is provided which supplies the auxiliary steam to the turbine via the control valve and the main steam supply line, and the control device performs control such that when the auxiliary steam is supplied to the turbine, the auxiliary steam is supplied from the second auxiliary steam supply line to the control valve.

11. A method for operating the steam turbine plant according to claim 1, the method comprising:
supplying auxiliary steam to the turbine from the downstream side of the control valve provided in the main steam supply line before a drive timing of a main steam generation source;
stopping a supply of the auxiliary steam to the turbine when or before a condition for supplying steam to the turbine is satisfied; and
starting a supply of main steam to the turbine when the condition for supplying the steam to the turbine is satisfied after the supply of the auxiliary steam to the turbine is stopped.

12. A combined cycle plant comprising:
a gas turbine including a compressor, a combustor, and a turbine;
a heat recovery steam generator that uses waste heat of flue gas from the gas turbine to generate steam; and
the steam turbine plant according to claim 1 that is driven by the steam generated by the heat recovery steam generator.

13. A combined cycle plant comprising:
a gas turbine including a compressor, a combustor, and a turbine;
a heat recovery steam generator that uses waste heat of flue gas from the gas turbine to generate steam; and
the steam turbine plant according to claim 5 that is driven by the steam generated by the heat recovery steam generator,
wherein a drive timing of a main steam generation source is a steam generation start timing of the heat recovery steam generator, which is determined by ignition of the gas turbine.

14. A method for operating the combined cycle plant according to claim 12, the method comprising:
supplying auxiliary steam to the turbine from the downstream side of the control valve provided in the main steam supply line before a steam generation timing of the heat recovery steam generator, which is determined by ignition of the gas turbine;
stopping a supply of the auxiliary steam to the turbine when or before a condition for supplying the steam to the turbine is satisfied; and
starting a supply of main steam to the turbine when the condition for supplying the steam to the turbine is satisfied after the supply of the auxiliary steam to the turbine is stopped.

15. A steam turbine plant comprising:
a first turbine and a second turbine;
a first main steam supply line that supplies main steam to the first turbine, and a second main steam supply line that supplies main steam to the second turbine;
a first control valve provided in the first main steam supply line and a second control valve provided in the second main steam supply line; and
one first auxiliary steam supply line that supplies auxiliary steam to the first and second turbines, wherein the one first auxiliary steam supply line merges into the first main steam supply line on a downstream side of the first control valve and merges into the second main steam supply line on a downstream side of the second control valve,
wherein the first control valve is a closest valve to the first and second turbines within the first main steam supply line, and the second control valve is a closest valve to the first and second turbines within the second main steam supply line.

* * * * *